UNITED STATES PATENT OFFICE.

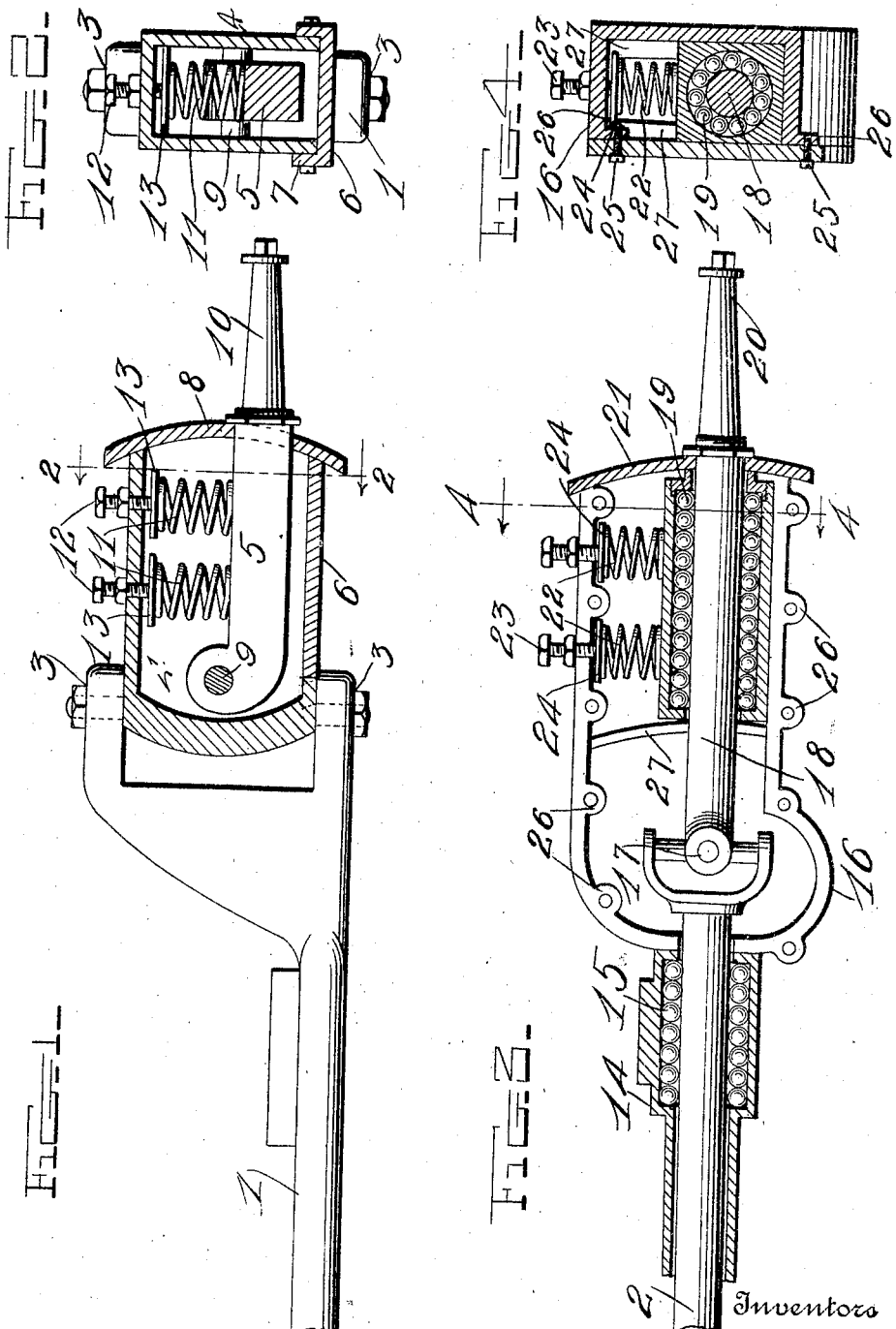

JOHN T. DAVIS AND JAMES H. ALLEN, OF ARGENTA, ARKANSAS; SAID ALLEN ASSIGNOR TO SAID DAVIS.

VEHICLE-AXLE.

1,011,325.

Specification of Letters Patent.

Patented Dec. 12, 1911.

Application filed December 1, 1910. Serial No. 595,127.

*To all whom it may concern:*

Be it known that we, JOHN T. DAVIS and JAMES H. ALLEN, citizens of the United States, residing at Argenta, in the county of Pulaski and State of Arkansas, have invented certain new and useful Improvements in Vehicle-Axles; and we do declare the following to be a full, clear, and exact description of the invention, such as will enable others skilled in the art to which it appertains to make and use the same.

This invention relates to improvements in axles for vehicles and particularly for motor vehicles.

One object of the invention is to provide an improved construction of axle having in connection therewith an arrangement of springs whereby the weight of the vehicle is yieldingly supported, and the axles thus relieved of a great deal of the strain to which they are usually subjected.

With this and other objects in view, the invention consists of certain novel features of construction, combination and arrangement of parts as will be more fully described and particularly pointed out in the appended claims.

In the accompanying drawings: Figure 1 is a side view of a portion of the front axle of an automobile, embodying the invention and showing the casing of the springs in section; Fig. 2 is a vertical cross section of the same on the line 2—2 of Fig. 1; Fig. 3 is a central vertical longitudinal sectional view of a portion of the rear driving axle; Fig. 4 is a vertical cross section of the same on the line 4—4 of Fig. 3.

Referring more particularly to the drawings, 1 denotes the front, steering axle and 2 denotes the rear driving axle of an automobile. The front axle has pivotally connected to its end, by knuckle joint 3, a spring casing 4 to which is hingedly connected the arm 5. The casing 4 is preferably in the form of a rectangular oblong box having an open outer end and lower side. The open lower side is closed by a removable bottom plate 6 having side flanges 7 which are bolted or otherwise secured to the sides of the casing near its lower edges as shown. The open outer end of the casing is closed by an end plate 8 which slidably engages the outer end of the casing and is preferably slightly curved as shown. The arm 5 of the axle has a squared inner portion and its inner end is hingedly connected to the sides of the casing as shown at 9. On the outer end of the arm 5 is formed the spindle 10 of the stub axle thus formed, said spindle projecting through a suitable passage in the end plate whereby said plate will slide up and down on the outer end of the casing when the arm is swung upwardly or downwardly by the wheels when passing over obstructions or rough surfaces. Between the upper side of the arm 5 and the top of the casing are arranged coiled springs 11 which yieldingly support the weight of the vehicle on the arm 5. The tension of the springs is regulated by adjusting screws 12 arranged in the upper side of the casing and having their inner ends engaged with adjusting plates 13 arranged between the upper ends of the springs and the upper side of the casing.

The rear axle 2 has its inner portion revolubly mounted in a casing 14 in which are arranged ball bearings 15 with which the axle is engaged. The end of the axle 2 projects beyond the end of the casing 14 and into a spring casing 16 which is arranged on the end of the axle casing 14 as shown. Connected to the end of the axle by a universal joint 17 is an arm 18. The arm 18 is revolubly mounted in ball bearings 19 arranged in the spring casing 16 and the spindle 20 on the end of the arm is engaged with and projects through the outer end plate 21 of the spring casing. The plate 21 slidably engages the end of the casing in the same manner as the end plate 8 of the front axle casing.

In the casing 16 of the rear axle, between the ball bearings 19 and the upper side of the casing, are arranged coiled springs 22 which yieldingly support the weight of the vehicle. The springs 22 are provided with tension adjusting screws 23 and plates 24 arranged above the same and in the upper side of the casing 16 as shown. One side of the casing 16 is preferably removable and is secured in place by suitable fastening screws 25 which are engaged therewith and with threaded apertures formed in lugs 26 on the casing.

On the inner side of the casing 16 are formed curved guide flanges 27 which hold the ball bearings 19 in place when the same and the axle arm and spindle swing up and down.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined in the appended claims.

Having thus described our invention what we claim is:—

1. An axle having a vertically swinging arm and spindle, a casing inclosing said arm and having an open end, an end plate carried by said arm and slidably engaging the end of the casing, and springs arranged within the casing and bearing on said arm.

2. In combination with an axle, of a stub axle movably attached thereto, a casing engaging the connecting end of said stub axle and having an open end, an end plate carried by the stub axle and slidably engaging the open end of the casing, and means engaging with the stub axle for yieldingly supporting the weight of the vehicle.

3. An axle having a vertically swinging arm and spindle, a casing inclosing said arm and having an open end, an end plate carried by said arm and slidably engaging the end of the casing, coiled springs bearing at one end against the said arm, adjusting plates bearing against the opposite end of the springs, and tension screws mounted in the casing and engaging said plates.

4. The combination of an axle casing, an axle revolubly mounted therein, a spring casing arranged on the outer end of said axle casing, an axle arm and spindle having a universal joint connection with the end of the axle, an end plate fixed to said arm and slidably engaging the end of the spring casing, and springs arranged between said axle arm and the casing.

In testimony whereof we have hereunto set our hands in presence of two subscribing witnesses.

JOHN T. DAVIS.
JAMES H. ALLEN.

Witnesses:
LEE W. DAWKINS,
LOUIS E. SOUTHWICK.